(12) United States Patent
Manis et al.

(10) Patent No.: US 12,488,632 B2
(45) Date of Patent: Dec. 2, 2025

(54) DATA COMPRESSION METHODS FOR VEHICLES

(71) Applicant: INTERNATIONAL ENGINE INTELLECTUAL PROPERTY COMPANY, LLC, Lisle, IL (US)

(72) Inventors: Joshua David Manis, Bolingbrook, IL (US); Paul Charintranond, Palatine, IL (US); Katie Rasmussen, Bolingbrook, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 148 days.

(21) Appl. No.: 18/101,150

(22) Filed: Jan. 25, 2023

(65) Prior Publication Data

US 2024/0249562 A1 Jul. 25, 2024

(51) Int. Cl.
*G07C 5/00* (2006.01)
*G07C 5/08* (2006.01)

(52) U.S. Cl.
CPC .......... *G07C 5/008* (2013.01); *G07C 5/0816* (2013.01)

(58) Field of Classification Search
CPC .................... G07C 5/008; G07C 5/0816
See application file for complete search history.

(56) References Cited

U.S. PATENT DOCUMENTS

| | | | |
|---|---|---|---|
| 6,430,486 B1 | 8/2002 | Diaz et al. | |
| 8,350,688 B2 | 1/2013 | Wang et al. | |
| 2007/0299573 A1 | 12/2007 | Carlstrom | |
| 2008/0319599 A1 | 12/2008 | Ptak et al. | |
| 2009/0093925 A1 | 4/2009 | Gumbel | |
| 2010/0145565 A1 | 6/2010 | Rodriguez et al. | |
| 2010/0185356 A1 | 7/2010 | Haas et al. | |
| 2011/0153142 A1 | 6/2011 | Delaney et al. | |
| 2013/0097128 A1* | 4/2013 | Suzuki | G06F 16/2365 707/693 |
| 2013/0117030 A1* | 5/2013 | Qi | G10L 19/008 704/500 |
| 2018/0091630 A1* | 3/2018 | Yeung | H04B 1/385 |
| 2021/0241546 A1* | 8/2021 | Chafekar | G07C 5/0808 |

* cited by examiner

*Primary Examiner* — Vivek D Koppikar
*Assistant Examiner* — Jeffrey R Chalhoub
(74) *Attorney, Agent, or Firm* — Mark C. Bach; Umang Khanna

(57) ABSTRACT

Data compression methods for use with vehicles includes collecting and compressing data on a vehicle, sending the compressed data to a computing device, storing the compressed data, and decompressing the compressed data for real-time review and analysis thereof.

9 Claims, 2 Drawing Sheets

DATA COMPRESSION METHODS FOR VEHICLES

TECHNICAL FIELD

Data compression methods are configured for use with vehicles. The data compression methods collect and compress data on a vehicle, send the compressed data for downloading onto a computing device, store the compressed data, and decompress the compressed data.

BACKGROUND

Vast amounts of data are collected by a vehicle that are used for maintenance and repair thereof, for tracking emissions pursuant to regulatory requirements, and for tracking wear and tear of the vehicles to predict future failures. FIG. 1 illustrates a view of a known data collection and transmission methodology 1, wherein data is collected via a "Data Collected" step 2 from a service vehicle 3 and sent via a "Data Sent" step 4 using traditional data sending means 5, such as via cellular transmission protocols, or other like wireless data transmission means, to a computing device or server 6 wherein the raw data is downloaded at the computing device or server 5 via a "Data Download" step 7 for downloading, storage, via a "Raw Data Storage" step 8, whereupon the raw data may be reviewed and analyzed.

Because vehicular data generated and collected on a vehicle can be very large, it is difficult to obtain real-time or close to real-time data at a computing device for review. Often, the data collected relating to vehicle health statistics is collected at high fidelity, and due to the large amount of the data, it cannot be readily transmitted using traditional wireless technologies, such as, for example, cellular technology, at a rate useful to make vehicle health prognostic and diagnostic assertions. For example, it is typical that raw data transmission of sensor data of a vehicle is transmitted once every thirty seconds. And often, analysis of data for engineering purposes, such as for maintenance or repair issues, are done via data that is averaged over a day. Therefore, decisions on repair and maintenance of vehicle systems are typically made using low fidelity data.

Currently, vehicle health data is transferred using traditional communication systems and methodology at various intervals, providing a snapshot in time of a vehicle's health statistics. Often, this typically means that the data that is sent and collected is not real-time data, but data collected over a time period. As such, the data may be stale and not provide the detailed information to diagnostic engineers that are necessary for maintaining a vehicle. In other words, current review of the data may be too late to prevent catastrophic issues with the vehicle. In addition, the data sent over intervals may be compiled data that may miss important sensor datapoints, causing diagnostic engineers to miss diagnostic clues.

A need, therefore, exists for improved data collection and transmission methodologies. Specifically, a need exists for improved methodologies for collecting and compressing high fidelity vehicle sensor data and transmitting the same to receiver servers for storage, decompression, and review of the same. More specifically, a need exists for improved methodologies that allow for collection of vehicle sensor data in real-time or close to real-time.

Moreover, a need exists for improved methodologies that utilize known compression standards for changing high fidelity data to low fidelity data for easy transmission of the same. In addition, a need exists for improved methodologies for receiving compressed low fidelity data at receiver servers for decompression thereof and changing the low fidelity data to high fidelity data for storage, review, and analysis thereof. Specifically, a need exists for improved methodologies for utilizing the decompressed high fidelity data for deep dive engineering analysis thereof in real-time.

SUMMARY

One embodiment of a method of transmitting data from a vehicle to at least one of computing device and server comprises the steps of: providing a data collection system within a vehicle; collecting first data from at least one sensor within the vehicle to form first collected data; compressing the first collected data to form first compressed data; transmitting the first compressed data from the vehicle to the at least one computing device and server outside the vehicle; and decompressing the first compressed data to form first decompressed data, wherein the first decompressed data approximates the first collected data of the at least one sensor.

DETAILED DESCRIPTION

Data compression methods are configured for use with vehicles. The data compression methods collect and compress data on a vehicle, send the compressed data for downloading onto at least one computing device and server, store the compressed data, and decompress the compressed data.

Figure 1:
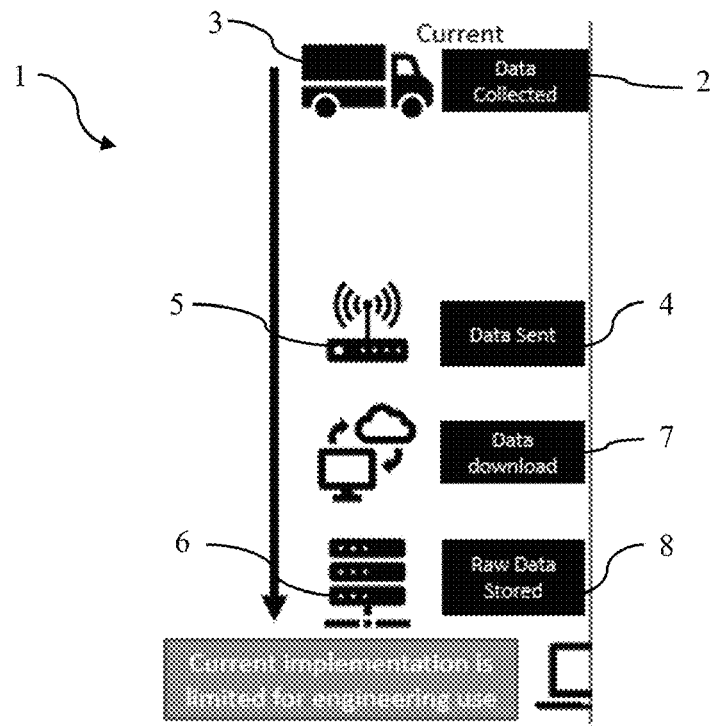
FIG. 1 is a diagram illustrating a prior art system and methodology for data collection and sending from a vehicle to a receiving server.
Figure 2:
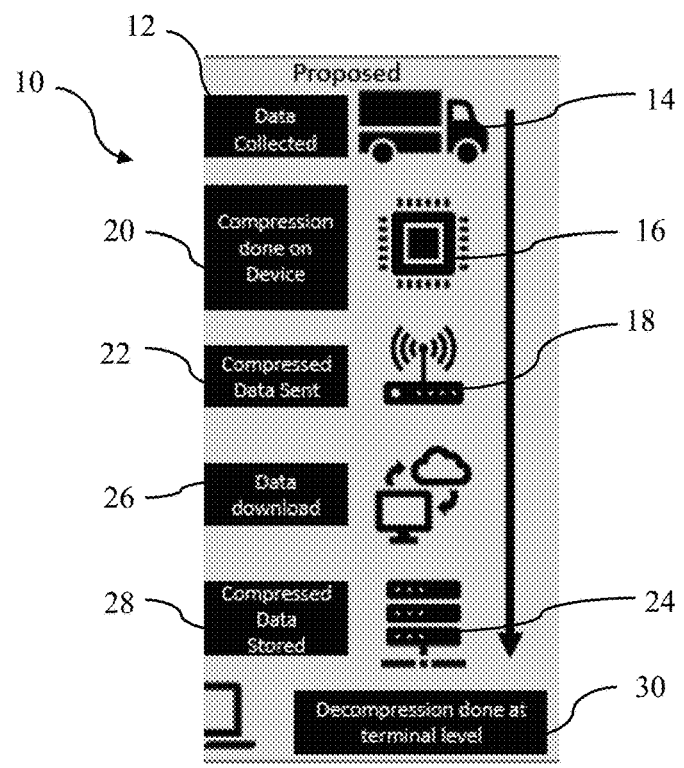
FIG. 2 is a diagram illustrating a system and methodology for collecting, compressing, sending, downloading, storing, and decompressing vehicle data described herein.

FIG. 2 is a flowchart illustrating a methodology 10 in an embodiment disclosed herein. The methodology 10 comprises a "Data Collected" step 12 for collecting raw data from a vehicle 14 with a data collection system or device 16 forming raw collected data. The raw collected data may be any data collected by at least one sensor onboard the vehicle. For example, the data collected may relate to information concerning how various systems within the vehicle is working at any given time. The data collected may relate to information concerning, for example, emissions or other similar environmental systems, or other like information required for collection to ensure that a vehicle remains within regulatory requirements.

In other examples, such data may be collected to determine whether a closed crankcase ventilator is working or stuck, whether a NOx sensor is operational, and/or other systems relating to emissions standards and regulatory requirements. Of course, the data collected may be from any type of sensor or from any other system on a vehicle that generates such data. The data collection system or device 16 may be a computing device having a processor, a storage, and/or a wireless transmission subsystem 18 for sending data collected thereby.

The raw collected data may be compressed via the data collection system or device 16 or other ancillary module connected thereto via a "Compression Done on Device" step 20 forming compressed data. The compressed data may then be sent via the wireless transmission subsystem 18 via a "Compressed Data Sent" step 22, which may send the compressed data to at least one computing device and server 24, whereupon the compressed data may be downloaded via "Data Download" step 26 and stored via a "Compressed Data Stored" step 28. The compressed data may subsequently be decompressed at the at least one computing device and server 24 forming decompressed data via a "Decompression Done at Terminal Level" step 30. As shown in more detail below, the decompressed data decompressed at the at least one computing device and server 24 may approximate the raw collected data prior to compression and decompression through the methodology 10 described above.

The compression of the raw collected data allows the compressed data to be sent to the at least one computing device or server 24 using reduced bandwidth of the transmission protocol used. The compressed data may also be sent from the vehicle 14 to the at least one computing device or server 24 at a higher time frequency. For example, whereas a typical transmission of raw collected data may be sent every 30 seconds or more, transmission of the compressed data as described herein may be sent at time intervals more frequently. Transmission of compressed data may occur at less than or equal to five second intervals, at less than or equal to three second intervals, and/or at less than or equal to 1 second intervals, therefore transmitting a larger amount of data more frequently from the vehicle 14 to the at least one computing device and server 24 than heretofore known.

Figure 3:
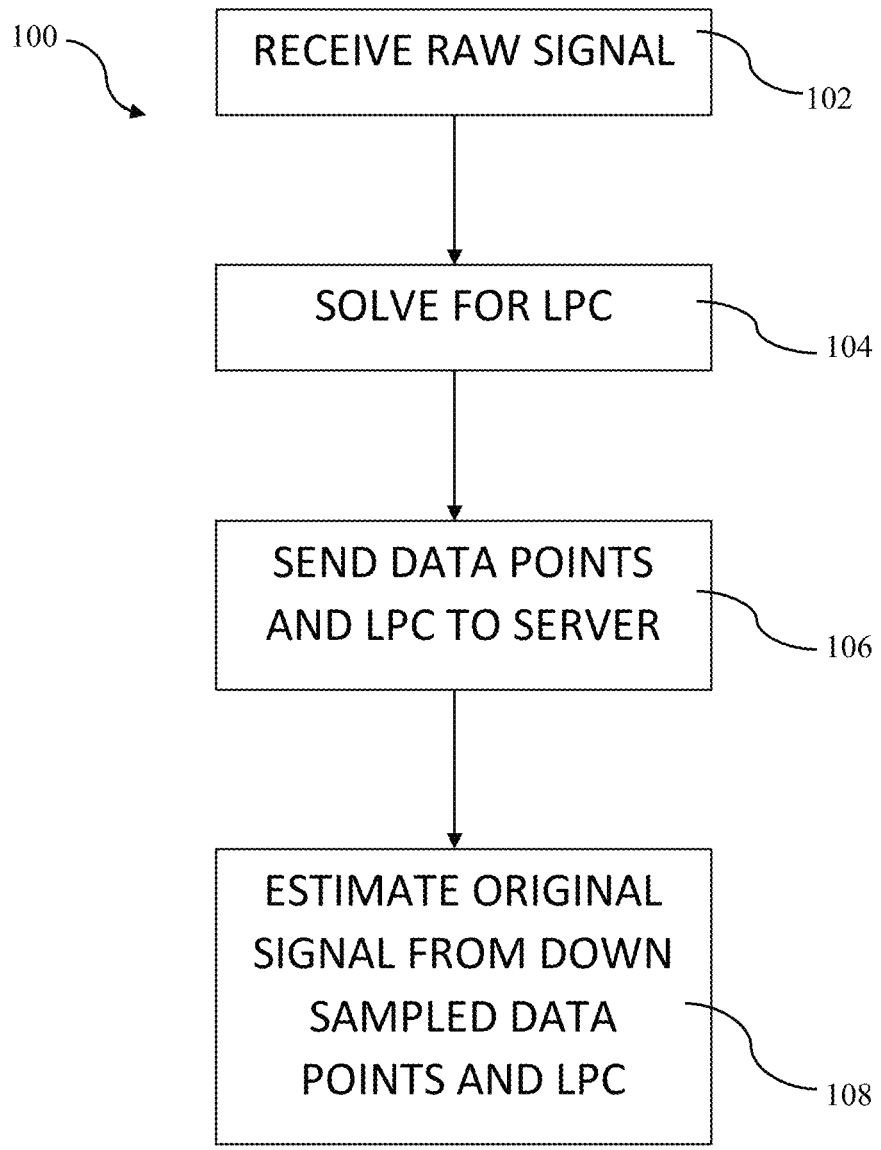
FIG. 3 is a diagram illustrating a methodology for vehicle sensor data compression and decompression described herein.

Sensor data compression and decompression may be accomplished via the steps illustrated in methodology 100 illustrated in FIG. 3. In a "Receive Raw Signal" step 102, data may be collected via one or more sensors or via any other data gathering apparatuses within a vehicle. Specifically, the data may be collected via the data collection system or device 16 at a sensor-collected baud rate. The data collection system or device 16, or another device or apparatus connected thereto, may compress the data by utilizing autocorrelation in a "Solve for LPC" step 104, thereby using autocorrelation to solve for linear predictive coefficients, thus reducing or compressing the collected data to compressed data. Other compression methodologies may also be used, such as cross-correlation, convolution, or other like compression methodologies.

The compressed data may be transmitted in a "Send Data Points and LPC to Server" step 106, whereby the compressed data, namely the linear predictive coefficients and the down-sampled data may be transmitted using typical transmission means such as, for example, cellular telephony technology or any other transmission methodology, to the computing device or server 24.

At the at least one computing device and server 24, the compressed data may be decompressed to form an "estimated signal" via a "Estimate Original Signal from Down Sampled Data and LPC" step 108 that closely correlates to the data collected by the data collection system or device 16 with reduced percent error between the data collected and the estimated signal. Specifically, the estimated signal may compare to a "real signal," which is defined as the data signal formed from the collected data and may have an error percentage when compared to the real signal of less than about one percent.

With the methodologies described herein, each vehicle within a fleet of vehicles may be monitored. The health of each vehicle may be monitored live in real-time or close to real-time for technical review when needed. Specifically, diagnostic review of monitored systems may be done immediately and data received may be very close in time to when data was created and collected on the vehicle. Engineering resolutions may therefore be determined very quickly to solve or prevent problems that may arise within the monitored vehicular systems. In addition, prognostic modeling capabilities may be expanded due to the acquisition and transmission of relatively larger data sets.

We claim:

1. A method of transmitting data from a vehicle to at least one of computing device and server outside of the vehicle, the method comprising the steps of:
   providing a data collection system within a vehicle;
   collecting first data from at least one sensor within the vehicle to form an original signal of the first collected data of the at least one sensor;
   compressing the original signal of the first collected data of the at least one sensor to form first compressed data, wherein the first compressed data is formed using an autocorrection algorithm to solve for linear predictive coefficients;
   transmitting the first compressed data and the linear predictive coefficients from the vehicle to the at least one of computing device and server outside the vehicle;
   decompressing the first compressed data using the linear predictive coefficients and the first compressed data to form an estimated signal comprising first decompressed data, wherein the first decompressed data approximates the first collected data of the at least one sensor such that the estimated signal has an average percent error of less than one percent when compared to the original signal; and
   predicting failure modes of monitored systems within the vehicle using the first decompressed data.

2. The method of claim 1 further comprising the step of:
   sending the first compressed data from the vehicle to at least one of computing device and server outside the vehicle using cellular telephony.

3. The method of claim 1 further comprising the step of:
   performing diagnostic review of the first decompressed data.

4. The method of claim 1 wherein the first collected data of the at least one sensor is formed from a plurality of sensors within the vehicle.

5. The method of claim 1 further comprising the steps of:
   collecting second data from at least one of the at least one sensor and another sensor within the vehicle to form second collected data from the at least one of the at least one sensor and another sensor within the vehicle;
   compressing the second collected data from the at least one of the at least one sensor and another sensor within the vehicle to form second compressed data;
   transmitting the second compressed data from the vehicle to the at least one of computing device and server outside the vehicle; and
   decompressing the second compressed data to form second decompressed data, wherein the second decompressed data approximates the second collected data from the at least one of the at least one sensor and another sensor within the vehicle.

6. The method of claim 5 wherein the second compressed data is sent to the at least one of computing device and server outside the vehicle after sending of the first compressed data to the at least one of computing device and server outside the vehicle.

7. The method of claim 5 wherein the second compressed data is sent to the at least one of computing device and server outside the vehicle within five seconds of sending the first compressed data to the at least one of computing device and server outside the vehicle.

8. The method of claim 5 wherein the second compressed data is sent to the at least one of computing device and server outside the vehicle within three seconds of sending the first compressed data to the at least one of computing device and server outside the vehicle.

9. The method of claim 5 wherein the second compressed data is sent to the at least one of computing device and server outside the vehicle within one second of sending the first compressed data to the at least one of computing device and server outside the vehicle.

* * * * *